United States Patent [19]

Makino et al.

[11] Patent Number: 5,327,334
[45] Date of Patent: Jul. 5, 1994

[54] ZERO CURRENT SWITCHING DC-DC CONVERTER INCORPORATING A TAPPED RESONANT INDUCTOR

[75] Inventors: Yasuhiro Makino, Kadoma; Lu Ding, Moriguchi, both of Japan

[73] Assignee: Sanyo Electric Co., Ltd., Moriguchi, Japan

[21] Appl. No.: 28,134

[22] Filed: Mar. 9, 1993

[30] Foreign Application Priority Data

Mar. 13, 1992 [JP] Japan .................................. 4-055211

[51] Int. Cl.⁵ .......................................... H02M 3/335
[52] U.S. Cl. .......................................... 363/20; 363/21
[58] Field of Search ............. 363/20, 21; H02M 3/28, H02M 3/33, 3/335

[56] References Cited

U.S. PATENT DOCUMENTS

| | | | |
|---|---|---|---|
| 4,720,667 | 1/1988 | Lee et al. ............................. | 323/271 |
| 4,785,387 | 11/1988 | Lee et al. ............................. | 363/21 |

FOREIGN PATENT DOCUMENTS

| | | | |
|---|---|---|---|
| 176413 | 4/1986 | European Pat. Off. ............. | 363/20 |
| 4121942 | 1/1993 | Fed. Rep. of Germany ......... | H02M 3/28 |

*Primary Examiner*—William H. Beha, Jr.
*Attorney, Agent, or Firm*—Nikaido, Marmelstein, Murray & Oram

[57] ABSTRACT

A current resonance DC-DC converter has a ZCS resonance switch circuit which comprises a semiconductor switch device 7 and a diode 8 connected together into a parallel circuit, the diode 8 being connected at its cathode to one end of a DC power supply 1, a center-tapped resonance inductance 13 adapted to produce voltages of the same polarity across the center tap and its respective opposite ends and connected at its resonance side to the anode of the diode 8, and a resonance capacitor 6 connected to the center tap of the resonance inductance 13 and to the above-mentioned one end of the power supply 1, the resonance inductance 13 being connected at a transformerside terminal thereof to one end of the primary inductance 4 of a high-frequency transformer HT, the other end of the primary inductance 4 being connected to the other end of the power supply 1.

2 Claims, 1 Drawing Sheet

ZERO CURRENT SWITCHING DC-DC CONVERTER INCORPORATING A TAPPED RESONANT INDUCTOR

FIELD OF THE INVENTION

The present invention relates to DC-DC converters of the current resonance type having a single switch device incorporated therein for use in various fields, for example, in microwave ovens and solar systems.

BACKGROUND OF THE INVENTION

With DC-DC converters placed into wide use in recent years, it has been required to provide such converters which are improved in characteristics, especially in efficiency, reduced in noise, lower in cost and smaller in size and weight. DC-DC converters of the type mentioned are lower in noise and smaller in size and weight than those of other types, and are introduced into use for various applications (T. IEE Japan, Vol. 111-D, No. 12, 1991, pp. 1087–1096).

With reference to FIG. 3, a description will be given first of the circuit of a conventional DC-DC converter of the current resonance type having a single switch device.

Between the primary inductance 4 of a high-frequency transformer HT and the secondary inductance 9 thereof, this circuit can be divided generally into a primary circuit including a DC power supply 1 and a secondary circuit including a load 15. The secondary circuit has a bridge rectifier circuit which is substituted for a full-wave rectifier circuit comprising a center-tapped transformer and used on the secondary side of the converter of the above literature.

The primary circuit comprises an input smoothing capacitor 2 connected in parallel to the DC power supply 1, and a zero-current switching resonance switch circuit (hereinafter referred to as the "ZCS resonance switch circuit 3") connected at its input side to the capacitor 2. The output side of the ZCS resonance switch circuit 3 is connected to one end of the primary inductance 4 of the high-frequency transformer HT.

The switch circuit 3 has a resonance inductance 5 serving as an input device. The inductance 5 for resonance has one end connected to the positive terminal of the DC power supply 1 and the other end connected to one end of a capacitor 6 for resonance and to the above-mentioned one end of the transformer primary inductance 4. The other ends of the resonance capacitor 6 and the transformer primary inductance 4 are connected to one end of a semiconductor switch device 7 and the cathode of a diode 8. The other end of the switch device 7 and the anode of the diode 8 are connected to the negative terminal of the power supply 1 and to the input smoothing capacitor 2.

On the other hand, the secondary circuit comprises a rectifier bridge of diodes 10 having AC input terminals connected to opposite ends of the secondary inductance 9 of the high-frequency transformer HT, and a choke coil 11 having one end connected to the positive output side of the diode bridge 10 and the other end connected to one end of each of a smoothing capacitor 12 and the load 15. The other ends of the smoothing capacitor 12 and the load 15 are connected to the negative side of the diode bridge 10.

The operation of the conventional converter circuit will be described. While the semiconductor switch device 7 is not conducting, the direct current through the primary circuit is blocked at the positions of the switch device 7 and the diode 8, and the resonance capacitor 6 discharged by the primary inductance 4 of the high-frequency transformer HT is held at zero charge level thereacross. The switch device 7 is triggered into conduction by an external control circuit (not shown) and brought out of conduction by the control circuit upon resonance current $i_{Lr}$ becoming zero when the direction of flow of the current changes from clockwise to counterclockwise. The external control circuit usually monitors the output voltage and produces a trigger of a period in conformity with the output voltage.

When the semiconductor switch device 7 is triggered into conduction by the control circuit, series resonance of the resonance inductance 5 and the resonance capacitor 6 starts to charge the capacitor 6, namely, to apply a voltage across the capacitor 6. At the same time, the resonance current $i_{Lr}$ partly starts to flow through the primary winding of the transformer HT as a transformer current $i_{T1}$. The series resonance circuit exhibits a very low impedance at resonance as is well known, and a great resonance current flows from the DC power supply 1 into the series resonance circuit at resonance since this circuit serves directly as the load of the DC power supply 1.

The resonance current $i_{Lr}$ due to the series resonance effected by the inductance 5 and the capacitor 6 reduces to zero the moment the direction of flow of the current $i_{Lr}$ changes from clockwise to counterclockwise, whereupon the switch device 7 becomes nonconducting. The resonance current $i_{Lr}$ flows counterclockwise through a closed circuit comprising the capacitor 6, inductance 5, DC power supply 1 and diode 8. In this way, one cycle of resonance is completed, and is followed by the next trigger. A portion of the counterclockwise resonance current $i_{Lr}$ flows also through the transformer primary inductance 4 which is disposed in parallel to the resonance capacitor 5.

During the cycle of resonance, on the other hand, voltage occurs across the transformer primary inductance 4, and the transformer current $i_{T1}$ flows therethrough as stated above. This develops an AC voltage across the transformer secondary inductance 9 in proportion to the turn ratio. The AC voltage is rectified by the diode bridge 10 and supplied to a smoothing circuit comprising the choke coil 11 and the smoothing capacitor 12. The smoothing circuit is a low-pass filter which is set to a sufficiently low cut-off frequency relative to the resonance frequency, and removes an AC component to give a substantially steady direct current, which is supplied to the load 15.

With the conventional converter described wherein the resonance current $i_{Lr}$ has a very great peak value when the semiconductor switch device 7 is conducting, the great resonance current is wholly supplied by the DC power supply 1 and the input smoothing capacitor 2.

Generally, the higher the resonance frequency, the more advantageous is the circuit to compact, so that it is common practice recently to use a resonance frequency which is as high as several tens of kHz to several hundreds of kHz. Usually, the DC-DC converter is separate from the DC power supply 1 and is connected thereto by wiring. Accordingly, the greater the high-frequency resonance current $i_{Lr}$ flowing through the DC power supply 1, the greater is the likelihood of electromagnetic disturbances occurring. This gives rise to a need, for example, to fortify the input smoothing capacitor 2 disposed in the vicinity of the power input terminal of the DC-DC converter so as to confine the high-frequency component within the circuit. Such a countermeasure presents difficulties in compacting the converter.

Further if a great high-frequency current flows through the DC power supply 1, the internal capacitor of the power supply 1 generates heat, which impairs the life of the capacitor, consequently shortening the life of the power supply 1.

Moreover, the resonance current $i_{Lr}$, if great, entails increases in the loss due to the conduction resistance of the semiconductor switch device 7 and in the ohmic loss of the resonance inductance 5 to result in a lower circuit efficiency of about 80%.

SUMMARY OF THE INVENTION

To overcome the foregoing problems, an object of the present invention is to provide a current resonance DC-DC converter of the type described which is excellent in circuit efficiency and which is so designed that a resonance current having a great peak value does not flow directly through the DC power supply 1.

According to the present invention, an input smoothing capacitor 2, and a new ZCS resonance switch circuit 14 and the primary inductance 4 of a high-frequency transformer HT as connected together in series are connected in parallel with a DC power supply 1 to constitute a primary circuit.

The new ZCS resonance switch circuit 14 comprises a semiconductor switch device 7, a diode 8, a resonance capacitor 6, and a center-tapped resonance inductance 13 of the type adapted to produce voltages of the same polarity at its opposite ends with respect to the center tap. On the other hand, exactly the same secondary circuit as in the conventional converter is used in the present converter.

According to the present invention, only the transformer current $i_{T1}$ which is smaller than the resonance current $i_{Lr}$ flows through the DC power supply 1 and the input smoothing capacitor 2. This reduces the likelihood of electromagnetic disturbances occurring and makes the capacitor 2 compact and easy to mount in place.

Furthermore, the replacement of the resonance inductance 5 conventionally used by the center-tapped inductance 13 of the type mentioned makes it possible to transmit a portion of the resonance energy to the secondary circuit by way of the high-frequency transformer, to lower the peak value of the current through the semiconductor switch device 7, to reduce the loss due to the conduction resistance of the switch device 7 in conduction, and to achieve an improved conversion efficiency.

Moreover, the resonance inductance 13 has an air-core structure and is therefore free of the, influence of the iron core that the magnetic permeability of the iron core becomes nonlinear relative to the current. This achieves an improved circuit efficiency and serves to make the circuit small-sized and light-weight.

Thus, the current resonance DC-DC converter incorporating a single switch device and provided by the present invention has a prolonged life and reduced size and achieves an improved efficiency.

DETAILED DESCRIPTION OF EMBODIMENT

The present invention will be described below with reference to the drawings showing an embodiment thereof.

First Embodiment

Figure 1:
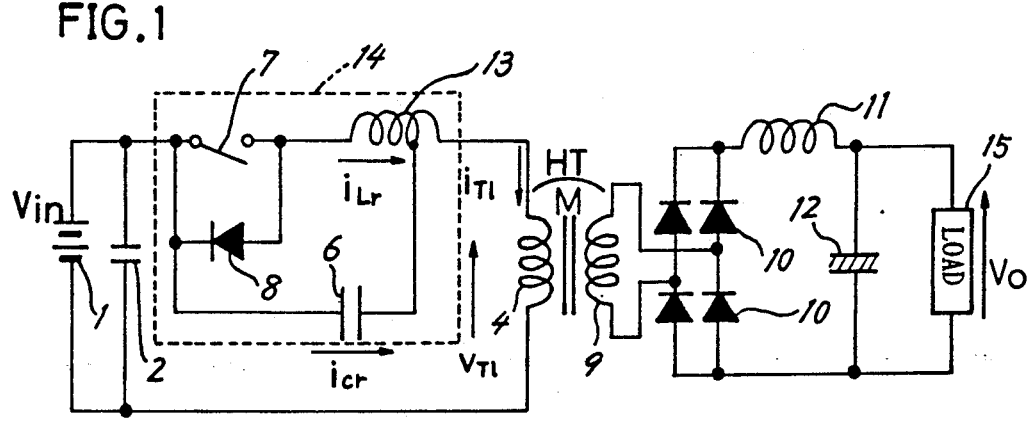
FIG. 1 is a circuit diagram of a current resonance DC-DC converter having a single switch device and embodying the invention.

FIG. 1 is a circuit diagram of the embodiment of the invention, i.e., a current resonance DC-DC converter having a single switch device incorporated therein. A center-tapped resonance inductance 13 will be described first which is the main component of the present invention. Used as the inductance 13 is an air-core center-tapped inductance, the conductor of which is wound in such a direction that voltages of the same polarity will be produced across the center tap and the respective inductance portions on opposite sides of the tap. The turn ratio of the resonance side of the inductance to the high-frequency transformer side thereof is set at 10:1.

The semiconductor switch device 7 used is the same as in the conventional converter and operates in the same manner. With the present embodiment, an IGBT (Insulated Gate Bipolar Transistor) is used as the device 7. The switch device 7 is triggered into conduction by an external control circuit (not shown) and brought out of conduction by the control circuit upon resonance current $i_{Lr}$ becoming zero when the direction of flow of the current changes from clockwise to counter-clockwise. The external control circuit usually monitors the output voltage and produces a trigger of a period conforming to the output voltage.

The construction of the converter circuit will be described with reference to FIG. 1. The present circuit is divided into two portions on opposite sides of a high-frequency transformer HT, i.e., into a primary circuit as a resonance side, and a secondary circuit including a load 15. The secondary circuit is identical with the conventional one in construction and operation.

The primary circuit comprises an input smoothing capacitor 2, and a new ZCS resonance switch circuit 14 and the primary inductance 4 of the high-frequency transformer HT connected together in series. The capacitor 2 and the assembly of the circuit 14 and inductance 4 are connected in parallel with a DC power supply 1.

The new ZCS resonance switch circuit 14 includes the semiconductor switch device 7, a diode 8 and a resonance capacitor 6. One end of each of the device 7 and the capacitor 6, and the cathode of the diode 8 are connected to the power supply 1. The other end of the switch device 7 and the anode of the diode 8 are connected to the resonance side of the center-tapped inductance 13. The other end of the resonance capacitor 6 is connected to the center tap of the inductance 13. The inductance 13 is connected at the transformer side thereof to one end of the primary inductance 4 of the high-frequency transformer HT. The other end of the transformer primary inductance 4 is connected to the negative terminal fo the DC power supply 1.

The operation of the converter circuit will be described next.

When the semiconductor switch device 7 is nonconducting, the voltage of the DC power supply 1 is applied almost entirely across the resonance capacitor 6, with the primary circuit out of operation.

When the switch device 7 is triggered into conduction by the external control circuit, the resonance capacitor 6 and the resonance-side inductance portion of the center-tapped inductance 13 form a resonance circuit, and the charge in the capacitor 6 flows as a clockwise resonance current $i_{Lr}$. This causes resonance to raise the potential of the transformer side of the center-tapped inductance 13 and passes a current through the primary inductance 4 of the transformer HT. In other words, a portion of the resonance current $i_{Lr}$ serves as a transformer current $i_{T1}$.

The resonance current $i_{Lr}$ flows predominantly through a closed circuit comprising the resonance capacitor 6, semiconductor switch device 7 and the resonance-side inductance portion of the center-tapped inductance 13. Thus, the resonance circuit of the invention is positioned in parallel to the DC power supply 1 and presents a high impedance to the power supply 1 at resonance, and a major portion of the resonance current iLr does not pass through the power supply 1. The external control circuit usually monitors the output voltage and produces a trigger with a period conforming to the output voltage.

Subsequently, the semiconductor switch device 7 becomes nonconducting when the resonance current $i_{Lr}$ has reduced to zero immediately before starting to flow counterclockwise upon a change in the direction of flow thereof. At this time, the diode 8 becomes conducting, so that the resonance current $i_{Lr}$ flows counterclockwise. The counterclockwise resonance current $i_{Lr}$ reduces the current through the primary inductance 4 of the transformer HT. In this way, one cycle of resonance is completed, and the circuit waits for the next trigger.

As described above, a major portion of great resonance current $i_{Lr}$ passes through the resonance circuit provided by the resonance capacitor 6 and the resonance-side inductance portion of the center-tapped inductance 13 and does not flow into the DC power supply 1.

Figure 2:
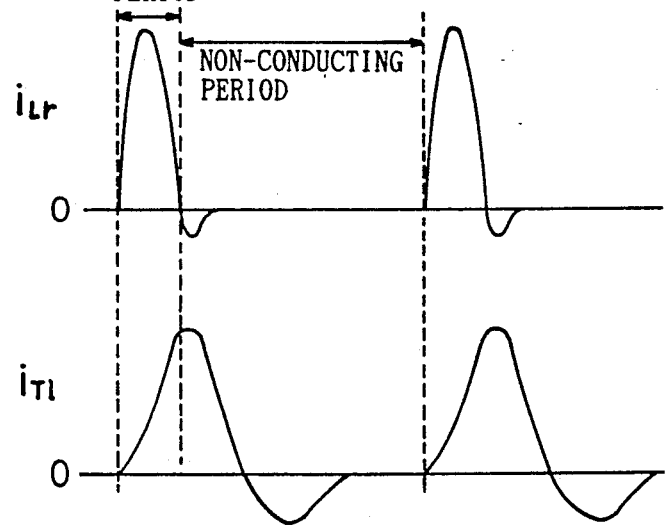
FIG. 2 is a diagram showing operation current waveforms of the circuit shown in FIG. 1.
Figure 3:
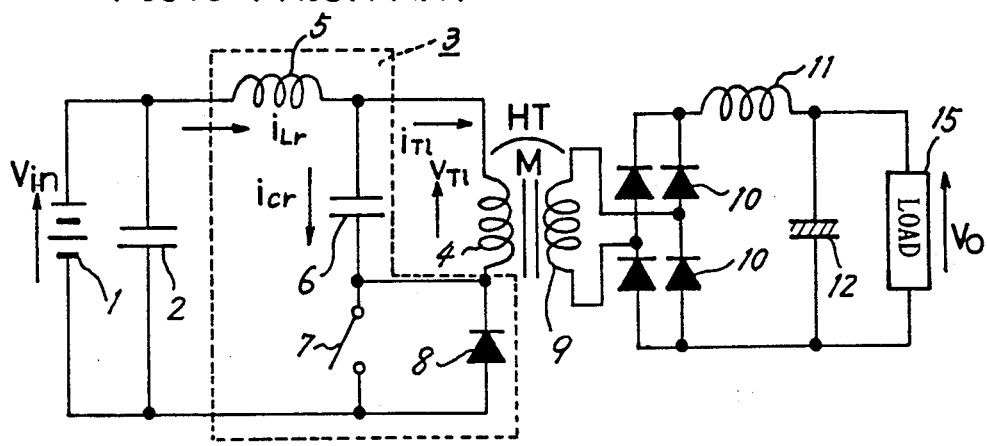
FIG. 3 is a circuit diagram of a conventional current resonance DC-DC converter having a single switch device.

FIG. 2 shows the waveforms of the resonance current $i_{Lr}$ and the transformer current $i_{T1}$. The variations in the transformer current $i_{T1}$ are transmitted as an alternating current to the secondary circuit via the high-frequency transformer HT. The alternating current is rectified by the rectifier diode bridge 10 and has its AC component removed by the smoothing circuit comprising tile choke coil 11 and the smoothing capacitor 12, whereby a substantially steady direct current is obtained. The current is supplied to the load 15.

According to the present invention, the use of the center-tapped inductance 13 enables the resonance current $i_{Lr}$ to derive a greater transformer current $i_{T1}$. This decreases the peak value of the resonance current $i_{Lr}$. The decrease in the peak value of the resonance current $i_{Lr}$ diminishes the loss due to the conductance resistance of the switch device 7 in conduction, enabling the present converter to achieve a higher conversion efficiency than the conventional device.

The resonance inductance 13 is an air-core center-tapped inductance of the type previously stated, which has been found to achieve a higher circuit efficiency than those of other types, i.e., an efficiency of about 90%.

Further with the resonance inductance 13 of the foregoing embodiment, the center tap ratio thereof, i.e., the turn ratio of the resonance side to the transformer side is set at 10:1, whereas the same effect as above is available when this ratio is 6:1 to 12:1

The foregoing embodiment is given for the description of the present invention and should not be construed as limiting the invention as defined in the appended claims or reducing the scope thereof. The converter of the invention is not limited to the embodiment in construction but can of course be modified variously by one skilled in the art without departing from the technical scope defined in the claims.

What is claimed is:

1. A current resonance DC-DC converter having a single switch device incorporated therein, the converter comprising a primary circuit and a secondary circuit, the primary circuit comprising a DC power supply having an input smoothing capacitor connected in parallel therewith, a zero-current switching (ZCS) resonance switch circuit and a primary inductance of a high-frequency transformer, the secondary circuit comprising a secondary inductance of the high-frequency transformer, rectifier diodes for rectifying voltage produced in the secondary inductance and a smoothing circuit for smoothing the voltage as rectified by the rectifier diodes, the current resonance DC-DC converter being characterized in that the ZCS resonance switch circuit comprises a semiconductor switch device and a diode connected together in parallel into a parallel circuit, the parallel circuit diode being connected at its cathode to one end of the DC power supply, a center-tapped resonance inductance adapted to produce voltages of the same polarity across the center tap and its respective opposite ends and connected at its resonance side to the anode of the parallel circuit diode, and a resonance capacitor connected to tile center tap of the resonance inductance and to said one end of the DC power supply, the resonance inductance being connected at a transformerside terminal thereof to one end of the transformer primary inductance, the other end of the transformer primary inductance being connected to the other end of the DC power supply.

2. A current resonance DC-DC converter as defined in claim 1 wherein the center-tapped resonance inductance is air-cored.

* * * * *